US005886477A

United States Patent [19]

Honbo et al.

[11] Patent Number: 5,886,477

[45] Date of Patent: Mar. 23, 1999

[54] DRIVER OF COLD-CATHODE FLUORESCENT LAMP

[75] Inventors: Nobuaki Honbo; Yasuhei Shimada, both of Tokyo, Japan

[73] Assignee: NEC Corporation, Tokyo, Japan

[21] Appl. No.: 73,065

[22] Filed: May 6, 1998

[30] Foreign Application Priority Data

May 27, 1997 [JP] Japan .................................... 9-137180

[51] Int. Cl.[6] ............................ H05B 37/00; H02N 2/00; G05F 5/00

[52] U.S. Cl. .................................... 315/209 PZ; 310/318; 323/299

[58] Field of Search ................................ 363/95, 97, 131; 310/311, 318, 319; 323/299, 301; 315/209 R, 209 PZ, 307, 308

[56] References Cited

U.S. PATENT DOCUMENTS 4,982,141 1/1991 Pace ..................................... 315/169.3
5,731,652 3/1998 Shimada .................................. 310/316
5,739,679 4/1998 Takehara et al. ........................ 323/299

FOREIGN PATENT DOCUMENTS 63-35171 2/1988 Japan .
6-311734 11/1994 Japan .
8-107678 4/1996 Japan .

*Primary Examiner*—Matthew Nguyen
*Attorney, Agent, or Firm*—Whitham, Curtis & Whitham

[57] ABSTRACT

In a driver of a CCFL for lightening the CCFL by using a piezoelectric transformer, a current supplied from a power source or a power consumption of the CCFL is detected and the piezoelectric transformer is on-off driven at a frequency different from an operating frequency of the piezoelectric trabsformer by a pulse width modulation signal having a duty cycle ratio corresponding to the detected value. The current supplied from the power source does not exceed a predetermined value, so that a capacity of the power source can be small and thus the cost of the power source can be reduced.

8 Claims, 7 Drawing Sheets

DRIVER OF COLD-CATHODE FLUORESCENT LAMP

BACKGROUND OF THE INVENTION

The present invention claims priority from Japanese Patent Application No.9-137180 filed May 27, 1997, which is incorporated herein by reference.

1. Field of the Invention

The present invention relates to a device for driving a cold cathod fluorescent lamp (CCFL) used as a back light of a liquid crystal display.

2. Description of Related Art

A piezoelectric transformer which utilizes piezoelectric effect has been known as a device for generating a high voltage for lightening a discharge tube such as a cold-cathode tube. Japanese Patent Application Laid-open No. Hei 8-107678 discloses an example of such driver for driving a cold-cathode tube utilizing a piezoelectric transformer. A construction of the disclosed driver is shown in FIG. 1.

In FIG. 1, a drive circuit 19 is connected to a primary side of a piezoelectric transformer 110 and a signal having a frequency close to a resonance frequency of the piezoelectric transformer 110 and generated by a frequency sweeping oscillator 113 is supplied to the drive circuit 19. In the drive circuit 19, a D.C. voltage supplied from a power source 11 is converted into an A.C. voltage having sinusoidal waveform with which the piezoelectric transformer 110 is driven. A secondary side of the piezoelectric transformer 110 is connected to one of terminals of the cold-cathode tube 111. The other terminal of the cold-cathode tube 111 is connected to a load current comparator circuit 112 and a current flowing from the piezoelectric transformer 110 through the cold-cathode tube 111 is input to the load current comparator circuit 112. In the load current comparator circuit 112, a current-voltage conversion is performed and a resultant voltage is compared with a reference voltage $V_{refA}$ corresponding to a desired load current value. An output of the load current comparator circuit 112 is supplied to the frequency sweeping oscillator 113 and a sweeping direction of driving frequency of the piezoelectric transformer 110 is determined by the result of comparison.

The piezoelectric transformer 110 has a boosting characteristics in which the boosting ratio becomes maximum at the resonance frequency thereof and rapidly reduced in a lower and higher frequency range with respect to the resonance frequency. The output frequency of the frequency sweeping oscillator 113 is changed toward the high frequency side when the current value of the cold-cathode tube 111 reaches a desired value to lower the boosting ratio of the piezoelectric transformer 110 to thereby reduce the current supplied to the CCFL 111, by utilizing this characteristics of the piezoelectric transformer. When the load current is smaller than the desired value, the output frequency of the frequency sweeping oscillator 113 is changed toward the low frequency side to increase the value of current supplied to the cold-cathode tube. Therefore, the frequency sweeping oscillator 113 is controlled such that it outputs a frequency in a range with which the desired load current is generated by the piezoelectric transformer 110.

By using the construction disclosed in Japanese Patent Application Laid-open No. Hei 8-107678, an inverter capable of flowing a constant A.C. current through the cold-cathode tube can be realized.

In the construction disclosed in Japanese Patent Application Laid open No. Hei 8-107678, however, there are some technical problems when a cold-cathode tube is lit as a load.

A first problem is that it is necessary to use a power source having large current capacity. That is, when a control is performed such that the value of current flowing through the cold-cathode tube is kept constant, a D.C. current $I_{DD}$ flowing from the power source through the drive circuit of the piezoelectric transformer increases rapidly up to a peak value within several minutes immediately after the cold-cathode tube is lit, decreases gradually thereafter and becomes constant, as shown in FIG. 2. This characteristics is caused by a temperature characteristics of the cold-cathode tube. That is, the voltage of the cold-cathode tube tends to increase when temperature of the cold-cathode tube is low in such a time immediately after the cold-cathode tube is lit. When the cold-cathode tube is lit continuously for a while, its temperature is increased by self-heat generation and then becomes in an equilibrium state at a constant temperature. In this state, when the drive circuit performs a control such that a constant current is flown through the cold-cathode tube, a power consumption of the tube increases immediately after the tube is lit. Therefore, the constant D.C. current supplied from the power source to the drive circuit is increased. Similarly, when ambient temperature is low, the tube voltage becomes high. Therefore, a current required in the drive circuit is also increased when compared with a case of a normal temperature. For these reasons, the current capacity of the power source of the drive circuit must have a margin large enough to supply the peak current immediately after the cold-cathode tube is lit and large current at practically minimum ambient temperature of the cold-cathode tube, resulting in an increase of cost of the power source.

A second problem is that it is impossible to easily set the maximum current of the power source. The reason for this is that, since an increase of power is caused by the temperature characteristics of the cold-cathode tube, it is necessary to know the power increase for every kind of cold-cathode tube and it is impossible to calculate the maximum output current value of the power source without evaluation of the temperature characteristics of the cold-cathode tube.

A third problem is that, when the cold-cathode tube is driven by using the piezoelectric transformer, it is impossible to use an over current protection circuit for limiting an output current by performing a pulse width modulation (PWM) at a drive frequency, which is well known system for limiting an output current. That is, when the circuit current of the cold-cathode tube by using such over-current protection circuit, luminance of the cold-cathode tube becomes unstable.

The over-current protection circuit for limiting the output current by using the pulse width modulation will be described. An example of the over-current protection circuit of this kind is disclosed in Japanese Patent Application Laid-open No. Sho 63-35171. A construction of the over-current protection circuit disclosed therein is shown in FIG. 3. In FIG. 3, a D.C. power source $V_{IN}$ is connected to one terminal of a primary side of a boosting electromagnetic transformer $T_1$ and a switching element $Q_1$ is connected to the other terminal of the electromagnetic transformer $T_1$. A resistor $R_2$ is connected to a source of the switching element $Q_1$ to detect an over-current and the source is connected to an oscillator circuit OSC and a pulse width modulator circuit PWM through a resistor $R_1$. An output of the pulse width modulation circuit PWM is supplied through an amplifier AMP to a gate of the switching element $Q_1$ to form a feedback loop A. An output of the oscillator circuit OSC is supplied to the pulse width modulator circuit PWM to form a feedback loop B. A capacitor $C_1$ for removing spike noise current caused by a switching operation of the switching element $Q_1$ is connected to the resistor $R_1$. A circuit composed of a rectifying diode $D_1$, a fly-wheel diode $D_2$, a smoothing inductor $L_1$, a smoothing capacitor $C_2$ and a load $L_o$ is connected to a secondary side of the electromagnetic transformer, as shown.

When an output current $I_o$ flowing from the electromagnetic transformer $T_1$ through the load $L_o$ becomes a predetermined value or larger, a current i flowing through the overcurrent detecting resistor $R_2$ increases proportionally to the current of the load. A voltage drop $iR_2$ across the resistor $R_2$ due to the current i is fedback to the pulse width modulator circuit PWM to shorten an on period of the switching element $Q_1$ when the current i becomes larger than a reference value. Further, an over-current detection signal is fedback to the oscillator circuit OSC. In this manner, it is possible to limit the current supplied from the electromagnetic transformer $T_1$ to the load $L_o$.

Another example of the over-current protection circuit is disclosed in Japanese Patent Application Laid-open No. Hei 6-311734, a construction of which is shown in FIG. 4. In FIG. 4, a MOS-FET $Q_2$ is connected between an input terminal $V_i$ and an output terminal $V_{out}$ and a rectifying/smoothing circuit composed of a diode $D_a$ a coil $L_a$ and a capacitor $C_a$ is connected between the MOS-FET $Q_2$ and the output terminal $V_{out}$. A series circuit of a resistor $R_c$ and a Zener diode ZD is connected between an electrode of the MOS-FET $Q_2$ on the side of the input terminal $V_i$ and a common potential point and a detector portion composed of a sync switch SW and voltage dividing resistors $R_a$ and $R_b$ is connected between an electrode of the MOS-FET $Q_2$ on the side of the output terminal $V_{out}$ and the common potential point. A comparator CMP is provided for comparing a potential of a junction point between a resistor $R_c$ and the Zener diode ZD with a potential of a junction between the voltage dividing resistors $R_a$ and $R_b$ and an output of the comparator is fedback through a pulse width control circuit PWMC and a drive circuit DRV to the MOS-FET $Q_2$. A saturation voltage when the MOS FET $Q_2$ is on is proportional to a current flowing through the MOS-FET $Q_2$ due to the presence of an onresistance of the switching element $Q_1$. When an over-current flows in such case that the output is short circuited in a state where the MOS-FET $Q_2$ is on, a drain current is detected as a voltage drop $V_{ds}$ due to the on-resistance of the MOS-FET $Q_2$. That is, a voltage divided by the voltage dividing resistors $R_a$ and $R_b$ is compared with the reference voltage given by the Zener diode ZD by the comparator CMP and the comparison result output thereof is input to a time ratio control terminal of the PWM control circuit. When the voltage obtained by the voltage dividing resistors $R_a$ and $R_b$ exceeds the reference voltage, the over-current protection is performed by shortening the on-time of given by the Zener diode ZD by the MOS-FET $Q_2$.

In each of the above mentioned two examples of the over-current protection circuit, the switching time for which the current is supplied to the electromagnetic transformer having a voltage boosting function or the coil at their driving frequency is controlled by the pulse width modulator PWM to limit current input to the electromagnetic transformer or the coil. However, these methods can not be applied to the drive circuit of the cold-cathode tube using the piezoelectric transformer. The reason for this will be described below.

In the previously mentioned construction disclosed in Japanese Patent Application Laid-open No. Hei 8-107678, the boosting ratio of the piezoelectric transformer 110 is changed by controlling the drive frequency of the piezoelectric transformer 110 such that the current supplied to the cold-cathode tube 111 becomes constant. Since the tube voltage of the cold-cathode tube 111 is not controlled, it is impossible, when the tube voltage is changed by the temperature characteristics of the cold-cathode tube, to avoid the increase of the power consumed by the tube, as mentioned previously.

Further, since the boosting capability of the piezoelectric transformer 110 is effective in only the vicinity of the resonance frequency thereof and has no such wide transmission frequency band as that of the electromagnetic transformer, the piezoelectric transformer 110 must be driven by a signal having sinusoidal waveform or other waveforms close to the sinusoidal waveform, otherwise the efficiency of the piezoelectric transformer is lowered. Assuming a case where a method for controlling the value of current supplied from the power source 11 within a predetermined value by driving the piezoelectric transformer 110 with a pulse width modulated waveform while sacrificing the efficiency of the piezoelectric transformer is employed, it becomes impossible to supply a predetermined tube current to the cold-cathode tube 111 since the boosting ratio is made variable by controlling the drive frequency of the piezoelectric transformer 110 as mentioned previously. Therefore, the frequency sweeping oscillator can not be locked to the resonance frequency of the piezoelectric transformer 110 and continues to sweep through the oscillation frequency range, so that the cold-cathode tube can not be lit stably. Thus, there may be a sudden change of luminance of the cold-cathode tube and the latter operates unsuitably as a light source.

That is, when the cold-cathode tube is used as a back light source of the liquid crystal display, the operation of the cold-cathode tube by which the light source becomes unstable is not allowed and it is necessary to maintain a stable amount of light even if the increase of current consumed is allowed. Therefore, it is impossible to limit the output current by using the PWM control at the drive frequency as in the case of the electromagnetic transformer.

SUMMARY OF THE INVENTION

An object of the present invention is to prevent, in a driver of a cold-cathode tube for efficiently operating the cold-cathode tube by using a piezoelectric transformer, a current supplied from a power source from exceeding a predetermined value.

In order to achieve the above object, according to a first aspect of the present invention, a driver of a cold-cathode tube comprises a piezoelectric transformer for boosting an A.C. voltage input to a primary input of the piezoelectric transformer and supplying a boosted voltage to a cold-cathode tube connected to a secondary terminal of the piezoelectric transformer, drive means for converting a D.C. voltage from a power source into an A.C. voltage and supplying it to the primary terminal of the piezoelectric transformer, first control means for detecting a load current flowing through the cold-cathode tube and controlling a frequency of the drive circuit such that the load current becomes a predetermined value and second control means for controlling a value of current supplied from the power source to the drive means, wherein the second control means comprises current detection means for detecting the value of current supplied to the drive means and means for generating, when the value of the current detected by the current detection means exceeds the predetermined value, a pulse width modulation signal having a duty cycle corresponding to a difference between the detected value and the predetermined value and on-off controlling the drive means periodically according to the pulse width modulation signal.

According to a second aspect of the present invention, a driver of a cold-cathode tube comprises a piezoelectric transformer for boosting an A.C. voltage input to a primary input of the piezoelectric transformer and supplying a boosted voltage to a cold-cathode tube connected to a secondary terminal of the piezoelectric transformer, drive means for converting a D.C. voltage from a power source into an A.C. voltage and supplying it to the primary terminal of the piezoelectric transformer, first control means for detecting a load current flowing through the cold-cathode tube and controlling a frequency of the drive circuit such that the load current becomes a predetermined value and second control means for controlling a value of current supplied from the power source to the drive means, wherein the second control means comprises consumed power detection means for detecting a power consumed in the cold-cathode tube and means for generating, when the value of the current detected by the consumed power detection means exceeds the predetermined value, a pulse width modulation signal having a duty cycle corresponding to a difference between the detected value and the predetermined value and on-off controlling the drive means periodically according to the pulse width modulation signal.

In these aspects, it is preferable to provide means for turning the first control means on or off according to the pulse width modulation signal such that the frequency of the pulse width modulation signal is changed by the first control means during an off time of the drive means. The frequency of the pulse width modulation signal is preferably lower than a frequency to be controlled by the first control means such that it does not influence on an operation of the piezoelectric transformer and high enough to remove flickering for human eyes. For example, the frequency is preferably higher than 60 Hz.

According to the present invention, it is possible to limit an average current flowing into the drive circuit within a predetermined current range by on-off controlling thee drive circuit at a frequency lower enough than the driving frequency and higher than 60 Hz with which human does not feel flickering, when the power source current increases immediately after the cold-cathode tube or in low temperature environment. Thus, the current margin of the power source can be reduced and the cost of the power source can be reduced.

BRIEF DESCRIPTION OF THE DRAWINGS

This above mentioned and other objects, features and advantages of the present invention will become more apparent by reference to the following detailed description of the invention taken in conjunction with the accompanying drawings, in which.

DETAILED DESCRIPTION OF PREFERRED EMBODIMENTS

Figure 1:
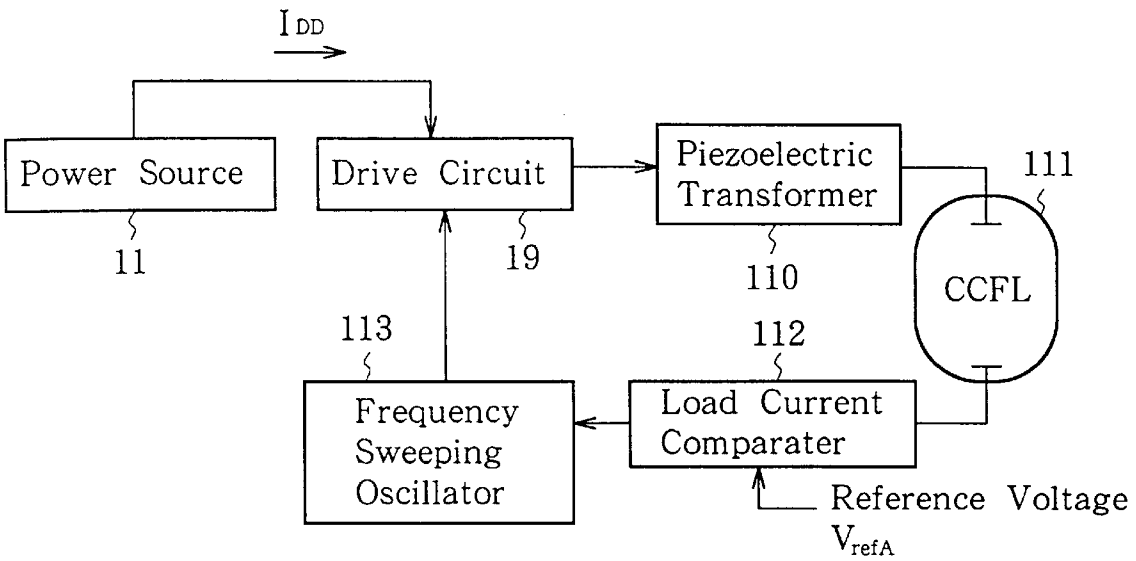
Prior Art FIG.1
FIG. 1 is a block circuit diagram of a conventional driver of a cold-cathode tube.
Figure 2:
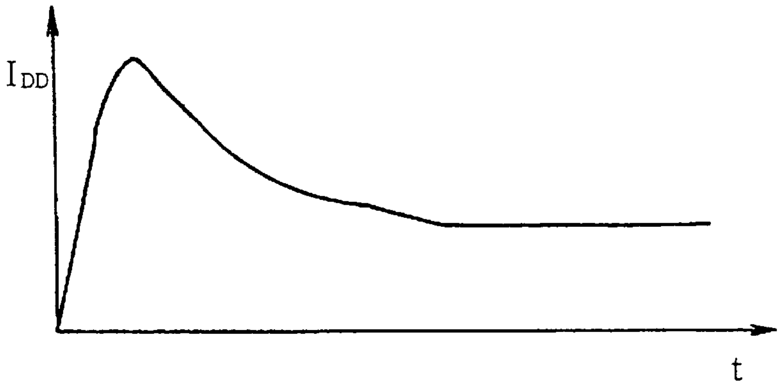
FIG. 2 is a graph showing a change of D.C. current $I_{DD}$ flowing from a power source through a drive circuit of a piezoelectric transformer after a cold-cathode tube is lit.
Figure 3:
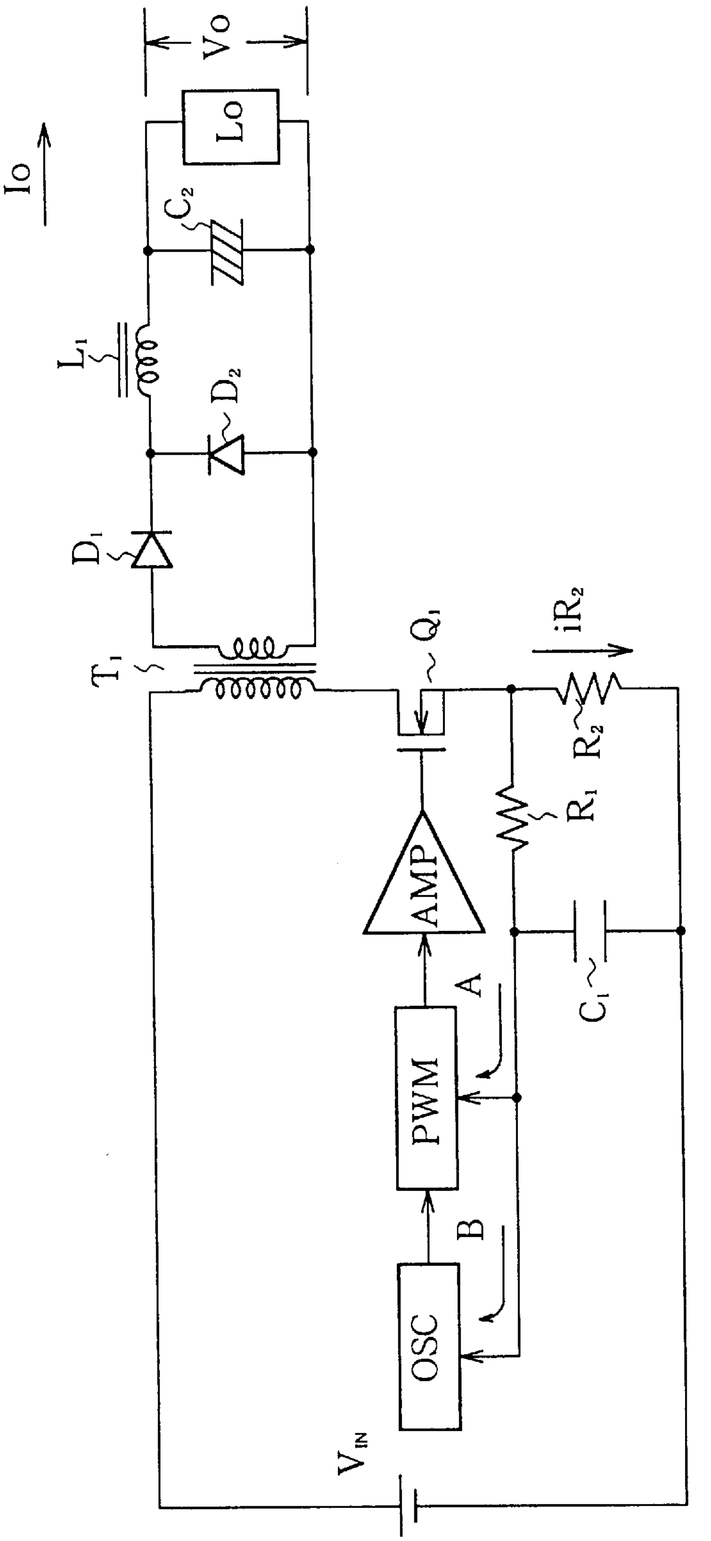
Prior Art FIG.3
FIG. 3 is a circuit diagram of a conventional over-current protection circuit.
Figure 4:
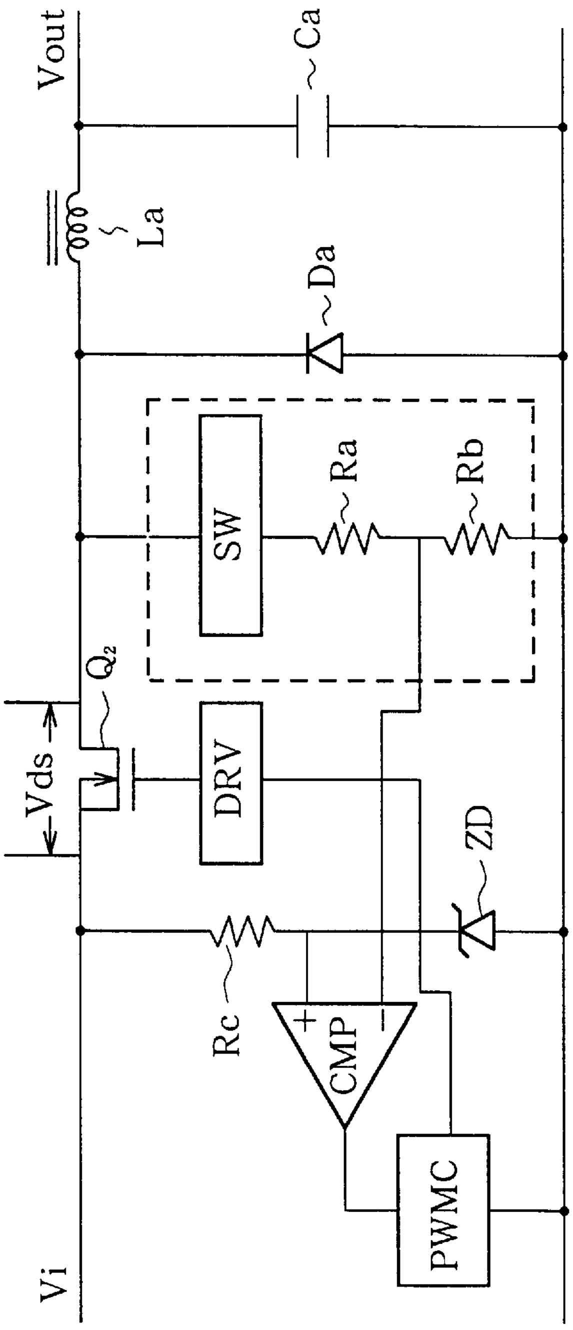
Prior Art FIG.4
FIG. 4 is a circuit diagram of another conventional over-current protection circuit.
Figure 5:
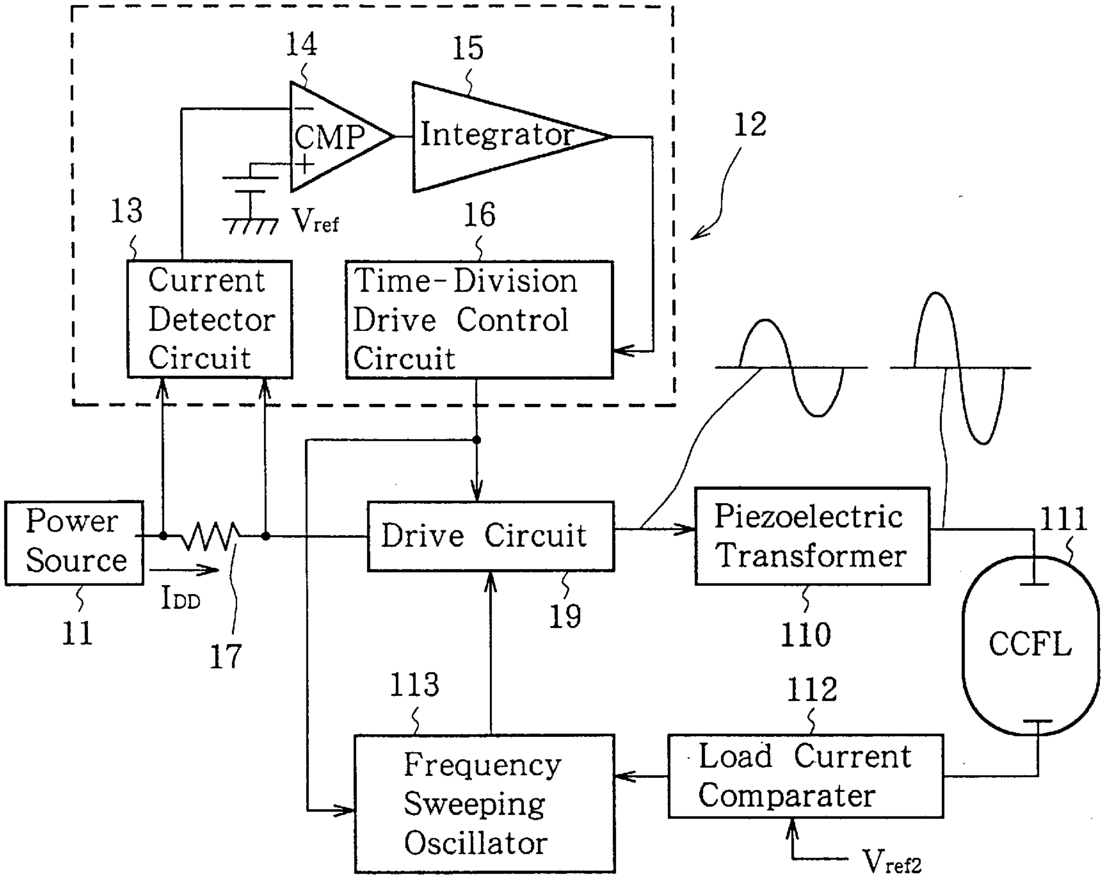
FIG. 5 is a block circuit diagram of a first embodiment of the present invention.

FIG. 5 is a block circuit diagram of a first embodiment of the present invention. The first embodiment comprises, in addition to a power source 11, a drive circuit 19, a piezoelectric transformer 110, a cold-cathode tube 111, a load current comparator circuit 112 and a frequency sweeping oscillator 113 as in the conventional driver shown in FIG. 1, a current detecting resistor 17 connected between the power source 11 and the drive circuit 19 and a current control circuit 12 connected in parallel to the current detecting resistor 17. The current control circuit 12 comprises a current detector circuit 13 for detecting a current flowing through the current detecting resistor 17 on the basis of a potential difference between opposite terminals of the current detecting resistor 17, a comparator 14 for comparing an output of the current detector circuit 13 with a reference voltage $V_{ref2}$, an integrator 15 for integrating an output of the comparator 14 and a time-division drive control circuit 16 for controlling the drive circuit 19 and the frequency sweeping oscillator 113 according to an output of the integrator 15.

A D.C. power is supplied from the power source 11 to the drive circuit 19. The drive circuit 19 converts a signal output from the frequency sweeping oscillator 113 into a voltage signal having sinusoidal waveform by which the piezoelectric transformer 110 is driven. The piezoelectric transformer 110 boosts the output voltage of the drive circuit 19 to drive the cold-cathode tube 111. A current flowing through the cold-cathode tube 111 flows into the load current comparator circuit 112. The load current comparator circuit 112 determines the drive frequency of the piezoelectric transformer 110 such that the current flowing through the cold-cathode tube 111 becomes constant, by converting the latter current into a voltage value, comparing it with the reference voltage $V_{ref2}$ and supplying a result of comparison to the frequency sweeping oscillator 113. The signal output from the frequency sweeping oscillator 113 is input to the drive circuit 19.

Figure 6:
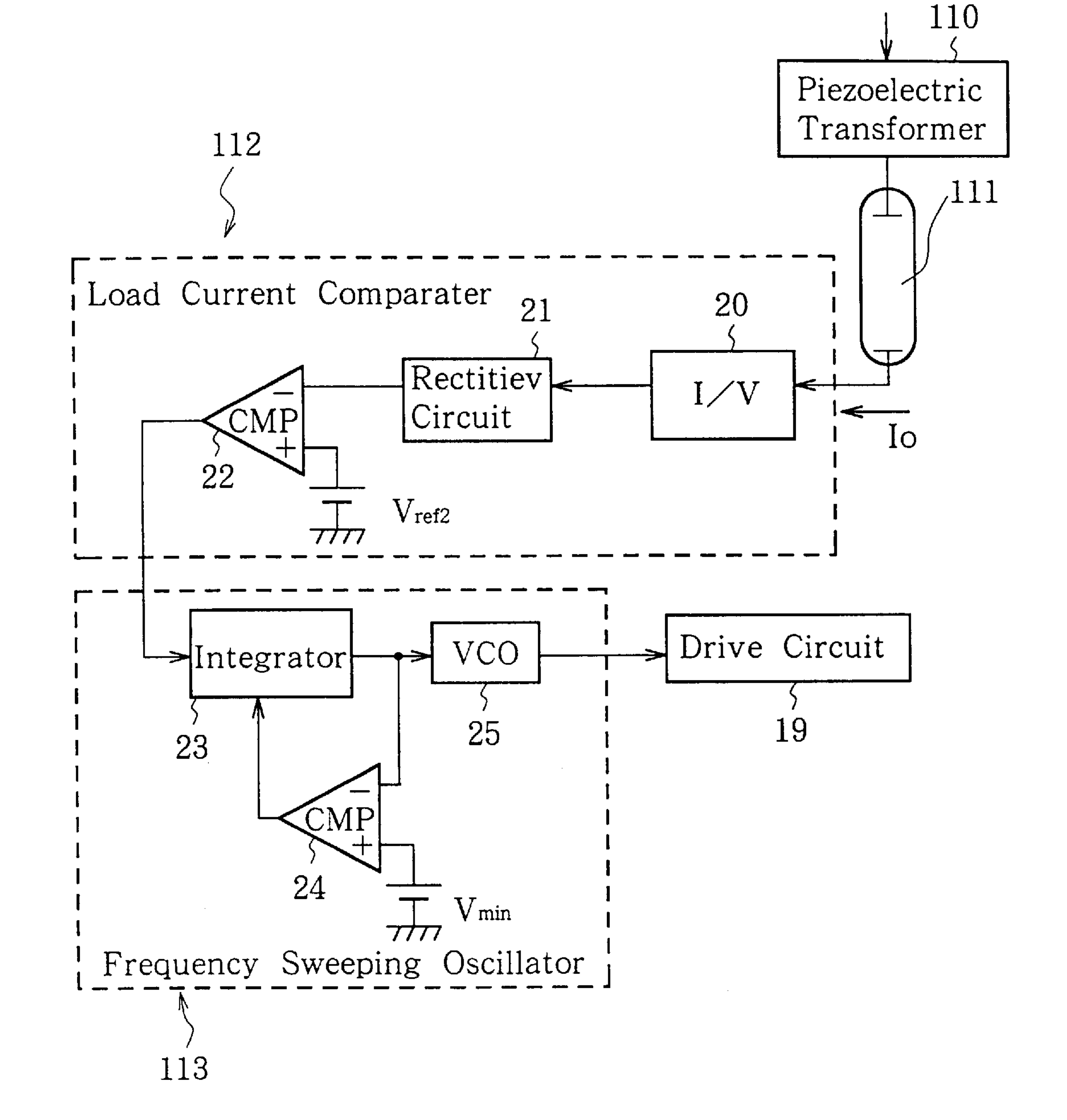
FIG. 6 is a detailed circuit diagram of a load current comparator circuit and a frequency sweeping oscillator.

FIG. 6 shows constructions of the load current comparator circuit 112 and the frequency sweeping oscillator 113 in detail. In FIG. 6, the load current comparator circuit 112 comprises a current-voltage converter circuit 20, a rectifier circuit 21 and a comparator 22 and the frequency sweeping oscillator 113 comprises an integrator circuit 23, a comparator 24 and a voltage-controlled oscillator 25. A current $I_o$ flowing through the cold-cathode tube 111 is converted into a voltage value by the current-voltage converter circuit 20 and a D.C. signal proportional to the current $I_o$ is obtained by the rectifier circuit 21. The D.C. signal is compared with the reference voltage $V_{ref2}$ by the comparator 22 and a result of comparison is input to the integrator 23 of the frequency sweeping oscillator 113 as a binary signal. When the value of current flowing through the cold-cathode tube 111 is smaller than a current value corresponding to the reference voltage $V_{ref2}$, the comparator 22 outputs a High level signal. The integrator 23 integrates the output of the comparator 22 to increase the output voltage in proportion to a time during which the comparator 22 outputs the High level signal. The voltage-controlled oscillator 25 is constructed such that its output frequency is lowered in reverse proportion to the input voltage and supplies a signal whose frequency is lowered with time to the drive circuit 19 when the current $I_o$ flowing through the cold-cathode tube 111 is smaller than the value determined by the reference voltage $V_{ref2}$. Further, the comparator 24 supplies a reset signal to the integrator 23 when the output voltage of the integrator 23 becomes lager than a reference voltage $V_{min}$ to minimize the output voltage of the integrator 23. Therefore, the output frequency of the voltage-controlled oscillator 25 is reset to the maximum frequency immediately. That is, the oscillation frequency of the voltage-controlled oscillator 25 is swept from the maximum frequency to the low frequency side gradually when the current flowing through the cold-cathode tube 111 is smaller than the predetermined value and is set again to the maximum frequency when it reaches the minimum frequency. This operation is repeated. By setting the range of the oscillation frequency of the voltage-controlled oscillator 25 such that the resonance frequency of the piezoelectric transformer 110 is included within the oscillation frequency range of the voltage-controlled oscillator 25, the boost ratio of the piezoelectric transformer 110 is increased gradually with the sweeping of the oscillation frequency of the voltage-controlled oscillator 25 from the high frequency side to the low frequency side, so that the current flowing through the CCFL 111 is increased. When the output of the rectifier circuit 21 becomes higher than the reference voltage $V_{ref2}$, the output of the comparator 22 becomes Low level. Since, therefore, the output voltage of the integrator 23 is lowered slightly, the oscillation frequency of the voltage-controlled oscillator 25 is increased. As a result, the boost ratio of the piezoelectric transformer 110 is lowered and, therefore, the current flowing through the CCFL 111 is reduced and the output of the comparator 22 is changed to High level again. In this manner, the comparator 22 operates to determine the drive frequency of the piezoelectric transformer 110 by frequently changing the output level thereof in the vicinity of the drive frequency at which the load current determined by the reference voltage $V_{ref2}$ is supplied.

Now, a construction and an operation of the power source current control circuit 12 will be described. The source current control circuit 12 comprises a current detector circuit 13, a comparator 14, an integrator 15 and a time-division drive control circuit 16. The current detector circuit 13 detects the current flowing through the current detecting resistor 17 on the basis of the potential difference across the resistor 17 and inputs the detected current to the inverted input side of the comparator 14. To the non-inverted input side of the comparator 14, the reference voltage $V_{ref}$ corresponding to the maximum value of the source current is input. If the current flowing through the resistor 17 becomes larger than the set value, the comparator 14 outputs a Low level. The output of the comparator 14 is connected to the integrator 15 and a high frequency component thereof is removed. The output voltage of the integrator 15 gradually increases when the Low level input signal from the comparator 14 continues. The output of the integrator 15 is input to the timedivision drive control circuit 16. The time-division drive control circuit 16 is constituted with a PWM oscillator circuit oscillating at a frequency which is lower enough than the drive frequency of the piezoelectric transformer 110 and is as high as several hundreds Hz at which flicker noise is invisible for human eyes and outputs the PWM signal whose High level time becomes longer with increase of the output voltage of the integrator 15. The PWM signal is supplied to the drive circuit 19 and the frequency sweeping oscillator 113.

Figure 7:
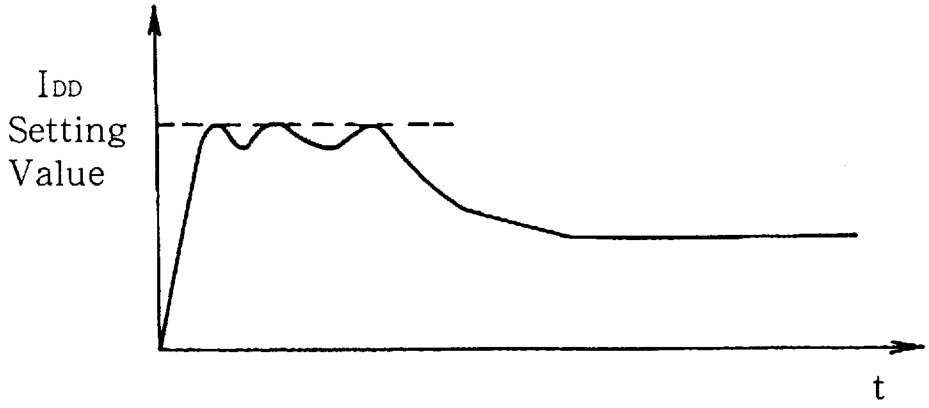
FIG. 7 is a graph showing a change of D.C. current $I_{DD}$ flowing from a power source through a drive circuit of a piezoelectric transformer after a cold-cathode tube is lit.

The drive circuit 19 operates to stop a driving of the piezoelectric transformer 110 during a period in which the PWM signal from the time-division drive control circuit 16 is High level and the frequency sweeping oscillator 113 operates to maintain the drive frequency constant by neglecting the output signal of the load current comparator circuit 112. By stopping the driving of the piezoelectric transformer 110 by the PWM signal, the average current value of the current $I_{DD}$ supplied from the power source 11 is reduced, so that it does not exceed the set value, as shown in FIG. 7. Further, since the drive frequency is kept constant, there is no current flowing through the cold-cathode tube 111 as the load even when the drive circuit 19 stops the driving of the piezoelectric transformer 110 and it is possible to prevent the load current comparator circuit 112 from sweeping the drive frequency of the piezoelectric transformer 110 toward the low frequency side and to prevent the boost ratio of the piezoelectric transformer from becoming too low to make the lightening of the CCFL 111 possible when the time-division drive control circuit 16 drives the piezoelectric transformer in a next time period.

Describing parameters of the various constructive components of the driver of the CCFL in detail, the piezoelectric transformer 110 has a size of 42 mm×5.5 mm×1 mm, a resonance frequency of about 118 kHz and a boost ratio of about 12. When a signal having sinusoidal waveform of about 50 $V_{rms}$ is input to the piezoelectric transformer 110, the output voltage thereof becomes about 600 $V_{rms}$. Assuming that an impedance of the CCFL 111 is about 120 kΩ, a current of about 5 $mA_{rms}$ flows for the sine waveform input voltage of about 600 $V_{rms}$. Assuming that the source voltage of the power source 11 is D.C. 12 V, the drive circuit 19 converts the D.C. 12 V into an A.C. sine signal having frequency of 118 kHz and average voltage of about 50 $V_{rms}$. The frequency sweeping oscillator 113 sweeps the frequency through a frequency range from about 100 kHz to about 130 kHz. The timedivision drive circuit 16 generates a signal having frequency of 210 Hz and varying duty cycle ratio (including a case of always Low level).

Figure 8:
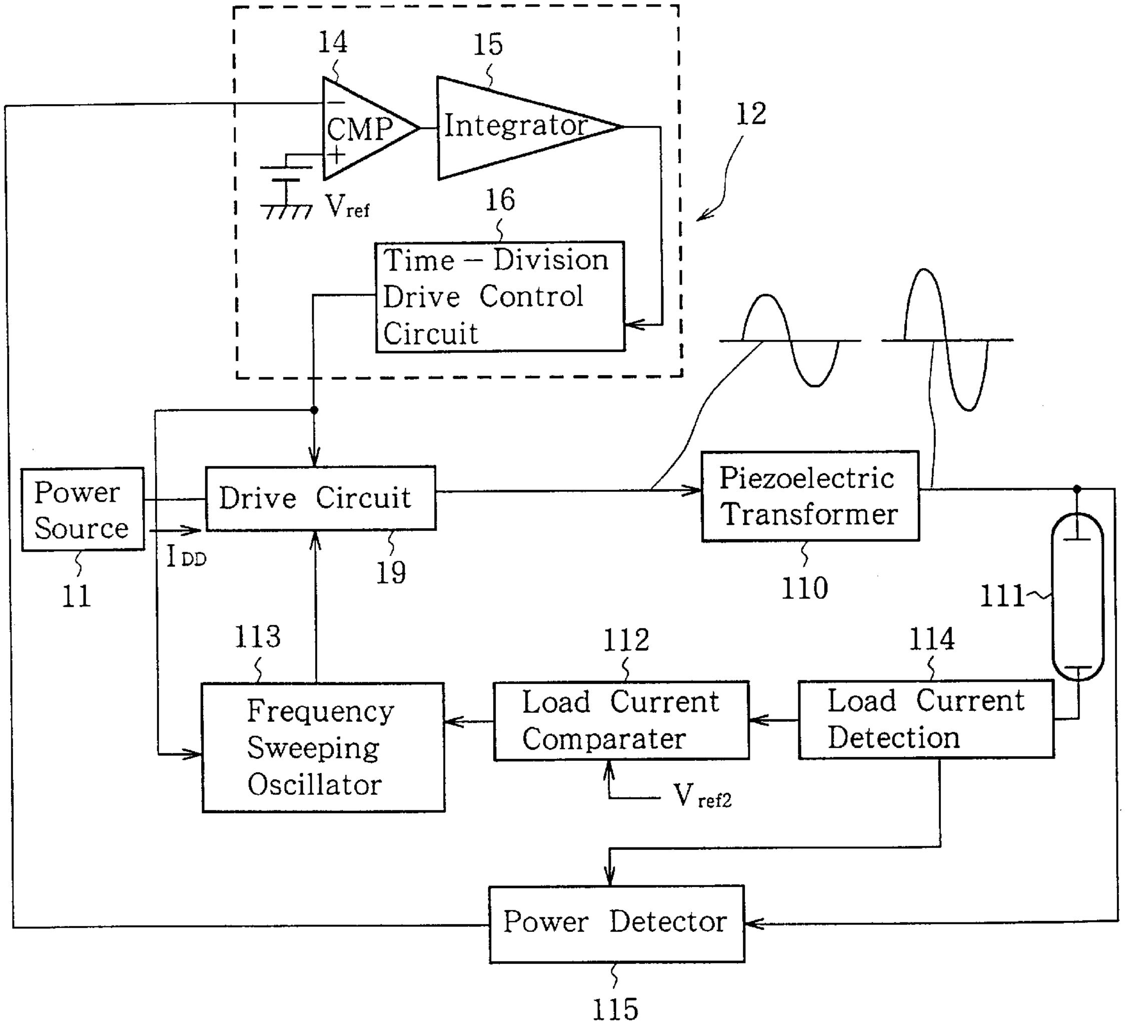
FIG. 8 is a block circuit diagram of a second embodiment of the present invention.

FIG. 8 is a block circuit diagram of a second embodiment of the present invention. In this embodiment, a power consumption of the CCFL is detected to control the upper limit thereof. That is, the embodiment shown in FIG. 8 differs from the first embodiment shown in FIG. 5 in that, in lieu of the current detecting resistor 17 and the current detector circuit 13 of the current control circuit 12, a load current detector circuit 114 is connected between the CCFL 111 and the load current comparator circuit 112 and a power detector circuit 115 for obtaining a power consumption of the CCFL 111 from a voltage applied to the CCFL 111 and an output of the load current detector circuit 114 is provided. The output of the power detector circuit 115 is input to the inverted input terminal of the comparator 14 of the current control circuit 12. The reference voltage $V_{ref}$ corresponding to the maximum load power is applied to the non-inverted input terminal of the comparator 14. When the power consumption of the CCFL 111 exceeds the reference voltage, the time-division drive control circuit 16 generates the PWM signal to control the driver such that the power supplied from the power source 11 does not exceeds the predetermined value as in the first embodiment.

As described hereinbefore, according to the present invention, it is possible to perform a control such that the maximum current supplied from the power source does not exceed the predetermined value. Therefore, there is no need of consideration of extra peak current and the cost of the power source can be reduced. Further, the predetermined maximum current value can be set by measuring power consumption of the CCFL operating normally, there is no need of considering the peak current flowing through the CCFL immediately after the latter is lit and there is no need of evaluating the current consumption in a low temperature environment. Since the power source current is limited, the luminance of the CCFL is lowered. However, since the large current flows only immediately after the CCFL is lit practically, there is no practical problem even if the luminance is not so high. Further, by performing the on-off control of the power source current at a certain rate, the on-off operation thereof can not be detected by human eyes.

What is claimed is:

1. A driver of a cold catbod fluorescent lamp (CCFL) comprising:

a piezoelectric transformer for boosting an A.C. voltage input to a primary terminal of said piezoelectric transformer by a piezoelectric effect thereof and supplying the boosted voltage to said CCFL connected to a secondary terminal of said piezoelectric transformer;

drive means for converting a D.C. voltage from a power source into an A.C. voltage and supplying the A.C. voltage to said primary terminal of said piezoelectric transformer;

first control means for detecting a load current flowing through said CCFL and controlling a frequency of said drive circuit such that the load current becomes a predetermined value; and second control means for controlling a value of current supplied from said power source to said drive means, wherein said second control means comprises current detector means for detecting a value of current supplied to said drive means and means for generating, when the detection value of said current detector means exceeds the predetermined value, a pulse width modulation signal having a duty cycle ratio corresponding to a difference between the detection value and the predetermined value and on-off controlling said drive means periodically according to the pulse width modulation signal.

2. A driver of a CCFL, as claimed in claim 1, further comprising means for on-off controlling said first control means according to the pulse width modulation signal such that the frequency is not changed by said first control means during a time for which said drive means is in an off state.

3. A driver of a CCFL, as claimed in claim 1, wherein a frequency of the pulse width modulation signal is lower than the frequency to be controlled by said first control means so that it does not influence on an operation of said piezoelectric transformer and is high to an extent that it does not provide a flicker to human eyes.

4. A driver of a CCFL, as claimed in claim 3, wherein the frequency of the pulse width modulation signal is higher than 60 Hz.

5. A driver of a CCFL, comprising:

a piezoelectric transformer for boosting an A.C. voltage input to a primary terminal of said piezoelectric transformer by a piezoelectric effect thereof and supplying the boosted voltage to said CCFL connected to a secondary terminal of said piezoelectric transformer;

drive means for converting a D.C. voltage from a power source into an A.C. voltage and supplying the A.C. voltage to said primary terminal of said piezoelectric transformer;

first control means for detecting a load current flowing through said CCFL and controlling a frequency of said drive circuit such that the load current becomes a predetermined value; and second control means for controlling a value of current supplied from said power source to said drive means, wherein said second control means comprises power consumption detector means for detecting a power consumption of said CCFL and means for generating, when the detection value of said power consumption detector means exceeds a predetermined value, a pulse width modulation signal having a duty cycle ratio corresponding to a difference between the detection value and the predetermined value and on-off controlling said drive means periodically according to the pulse width modulation signal.

6. A driver of a CCFL, as claimed in claim 5, further comprising means for on-off controlling said first control means according to the pulse width modulation signal such that the frequency is not changed by said first control means during a time for which said drive means is in an off state.

7. A driver of a CCFL, as claimed in claim 5, wherein a frequency of the pulse width modulation signal is lower than the frequency to be controlled by said first control means so that it does not influence on an operation of said piezoelectric transformer and is high to an extent that it does not provide a flicker to human eyes.

8. A driver of a CCFL, as claimed in claim 7, wherein the frequency of the pulse width modulation signal is higher than 60 Hz.

* * * * *